(12) United States Patent
Okabayashi et al.

(10) Patent No.: US 7,619,161 B2
(45) Date of Patent: Nov. 17, 2009

(54) GROUNDING DEVICE AND METHOD OF CONSTRUCTING THE SAME

(75) Inventors: Chikashi Okabayashi, Tokyo (JP); Makoto Ishizaki, Tokyo (JP); Minoru Yoneda, Tokyo (JP)

(73) Assignee: Sankosha Corporation, Tokyo (JP)

( * ) Notice: Subject to any disclaimer, the term of this patent is extended or adjusted under 35 U.S.C. 154(b) by 0 days.

(21) Appl. No.: 11/402,831

(22) Filed: Apr. 13, 2006

(65) Prior Publication Data

US 2006/0237213 A1 Oct. 26, 2006

(30) Foreign Application Priority Data

Apr. 21, 2005 (JP) ............................. 2005-123135

(51) Int. Cl.
*H05K 5/02* (2006.01)

(52) U.S. Cl. ............................. 174/51; 174/36; 174/115; 174/135; 439/92; 439/98; 361/799

(58) Field of Classification Search ........... 174/102 SC, 174/115, 36, 135, 102 C, 110 N, 6, 7, 40 CC, 174/51; 439/92, 98; 361/799
See application file for complete search history.

(56) References Cited

U.S. PATENT DOCUMENTS

| | | | | |
|---|---|---|---|---|
| 1,938,308 A | * | 12/1933 | William | 428/368 |
| 2,849,631 A | * | 8/1958 | Matz | 310/249 |
| 3,684,821 A | * | 8/1972 | Miyauchi et al. | 174/102 SC |
| 4,145,030 A | * | 3/1979 | Ingraham | 256/1 |
| 4,371,745 A | * | 2/1983 | Sakashita | 174/115 |
| 4,503,284 A | * | 3/1985 | Minnick et al. | 174/36 |
| 5,006,074 A | * | 4/1991 | Franks, Jr. | 439/92 |
| 6,046,408 A | * | 4/2000 | Forrest | 174/106 R |
| 6,881,306 B2 | * | 4/2005 | Schneck et al. | 204/196.06 |
| 7,385,140 B2 | * | 6/2008 | Ishizaki et al. | 174/102 SC |

FOREIGN PATENT DOCUMENTS

| | | | |
|---|---|---|---|
| EP | 0784 327 A1 | * | 8/1997 |
| JP | 5-182701 | | 7/1993 |
| JP | 40925994 A | * | 10/1997 |

* cited by examiner

*Primary Examiner*—Dhiru R Patel
(74) *Attorney, Agent, or Firm*—Westerman, Hattori, Daniels & Adrian, LLP

(57) ABSTRACT

The present invention relates to a grounding device in which a grounding member E having a grounding conductor 2 and a conductive laminated portion 5 covering the grounding conductor 2 is integrated with a foundation member B of a building so that the grounding member E and the foundation member B overlap partly or entirely. The grounding device is configured so that the grounding member having the grounding conductor and the conductive laminated portion covering the grounding conductor is integrated with the foundation member of the building are so that the grounding member and the foundation member overlap partly or entirely. This makes it possible to easily offer a small grounding resistance. Further, the foundation member of the building contacts the earth over a large area. This enables a small grounding resistance to be stably offered for a long period.

5 Claims, 4 Drawing Sheets

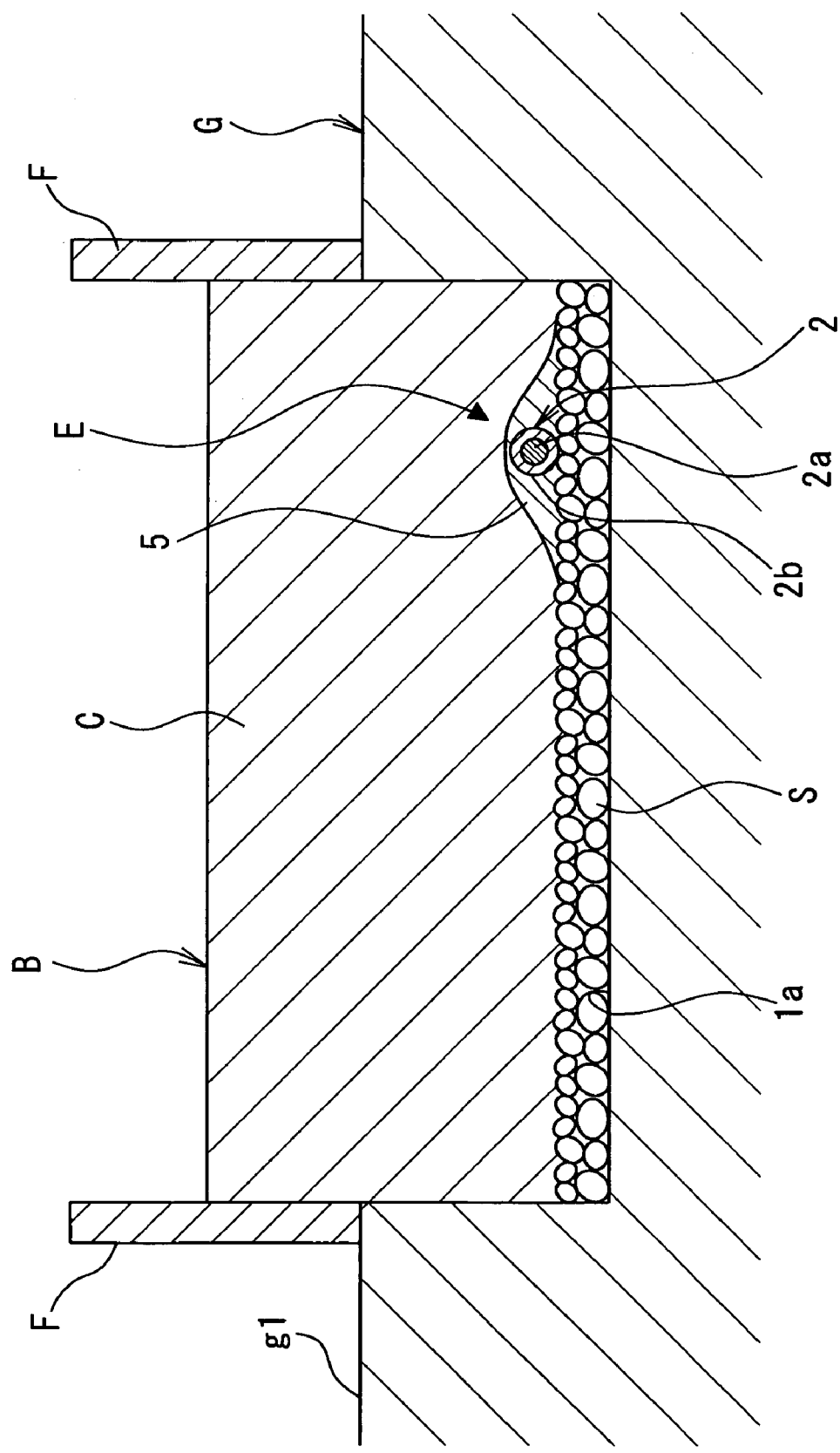

GROUNDING DEVICE AND METHOD OF CONSTRUCTING THE SAME

FIELD OF THE INVENTION

The present invention relates to a grounding device installed in a foundation portion of a building such as a house or a factory and a method of constructing the grounding device.

BACKGROUND OF THE INVENTION

A grounding device for use in a building such as a house or a factory is an elongate grounding bar composed of a conductive metal material and driven into vacant land in the premise. Such a grounding device and a method of constructing the grounding device are disclosed in, for example, the Unexamined Japanese Patent Application Publication (Tokkai-Hei) No. 5-182701.

The conventional method of constructing a grounding device requires the check of a site into which the grounding bar is to be driven and the nearby earth for objects buried in these places before the driving of the grounding bar. Thus, the absence of buried objects must be confirmed before the grounding device can be constructed. This disadvantageously results in the need for much time and effort for construction of the grounding device.

The grounding device composed of the grounding bar driven into the earth may fail to offer a predetermined grounding resistance owing to the large specific resistance of the earth. A plurality of grounding bars must then be driven into the earth. This disadvantageously results in the need for more time and effort for construction of the grounding device.

The grounding bar driven directly into the earth may corrode earlier owing to the moisture in the earth or the like. This may disadvantageously prevent the grounding device from providing its original functions.

In the recent years, instead of 100 VAC, 200 VAC has often been used for houses in order to deal with electric appliances with large current carrying capacities. The introduction of 200-VAC indoor distribution lines into houses has required the grounding device to be more reliable. That is, the grounding device needs to offer at most a predetermined grounding resistance and to last longer, thus protecting not only the electric appliances but also users from accidents.

An object of the present invention is to solve the problems of the conventional grounding device and the conventional method of constructing the grounding device.

SUMMARY OF THE INVENTION

To achieve the above object, the present invention provides a grounding device configured so that a grounding member having a grounding conductor and a conductive laminated portion covering the grounding conductor is integrated with a foundation member of a building so that the grounding member and the foundation member overlap partly or entirely.

To achieve the above object, the present invention provides a method of installing a conducting device, the method comprising installing a grounding member having a grounding conductor and a conductive laminated portion covering the grounding conductor, and then placing green concrete on the grounding member.

The present invention is configured as described above and thus produces effects described below.

The grounding device is configured so that the grounding member having the grounding conductor and the conductive laminated portion covering the grounding conductor is integrated with the foundation member of the building so that the grounding member and the foundation member overlap partly or entirely. This makes it possible to easily offer a small grounding resistance. Further, the foundation member of the building contacts the earth over a large area. This enables a small grounding resistance to be stably offered for a long period.

The grounding device is configured so that the grounding member having the grounding conductor and the conductive laminated portion covering the grounding conductor is integrated with the foundation member of the building are so that the grounding member and the foundation member overlap partly or entirely. This makes it possible to prevent the grounding conductor from corroding owing to the moisture in the earth. The grounding member and thus the grounding device can therefore last longer.

The method of installing a conducting device comprises installing the grounding member having the grounding conductor and the conductive laminated portion covering the grounding conductor, and then placing green concrete on the grounding member. Thus, compared to the conventional method of constructing a grounding device after constructing a building, the present method can save the time and effort required to check the earth for buried objects or the like. This makes it possible to sharply reduce the time and effort required to install the grounding device.

BRIEF DESCRIPTION OF THE DRAWINGS

FIG. 1 is a sectional view of a drilled ditch in which a grounding member in accordance with the present invention is installed, the grounding member, and the like.

FIG. 2 is also a sectional view of the drilled ditch in which the grounding member in accordance with the present invention is installed, the grounding member, and the like.

FIG. 4 is a sectional view of the drilled ditch in which the grounding member in accordance with the present invention is installed, the grounding member, and the like.

DETAILED DESCRIPTION OF THE PREFERRED EMBODIMENTS

An embodiment of the present invention will be described below. However, the present invention is not limited to the present embodiment without departing from the spirit of the present invention.

1 is a ditch drilled in the earth G, and cobble stones S are laid at a bottom portion 1a of the drilled ditch 1, as required.

2 is a grounding conductor. The grounding conductor 2 has a conductive metal line 2a placed in a central portion. The conductive metal line 2a is covered with a conductive resin layer 2b composed of resin mixed with conductive carbon black powder or conductive metal powder.

Figure 1:
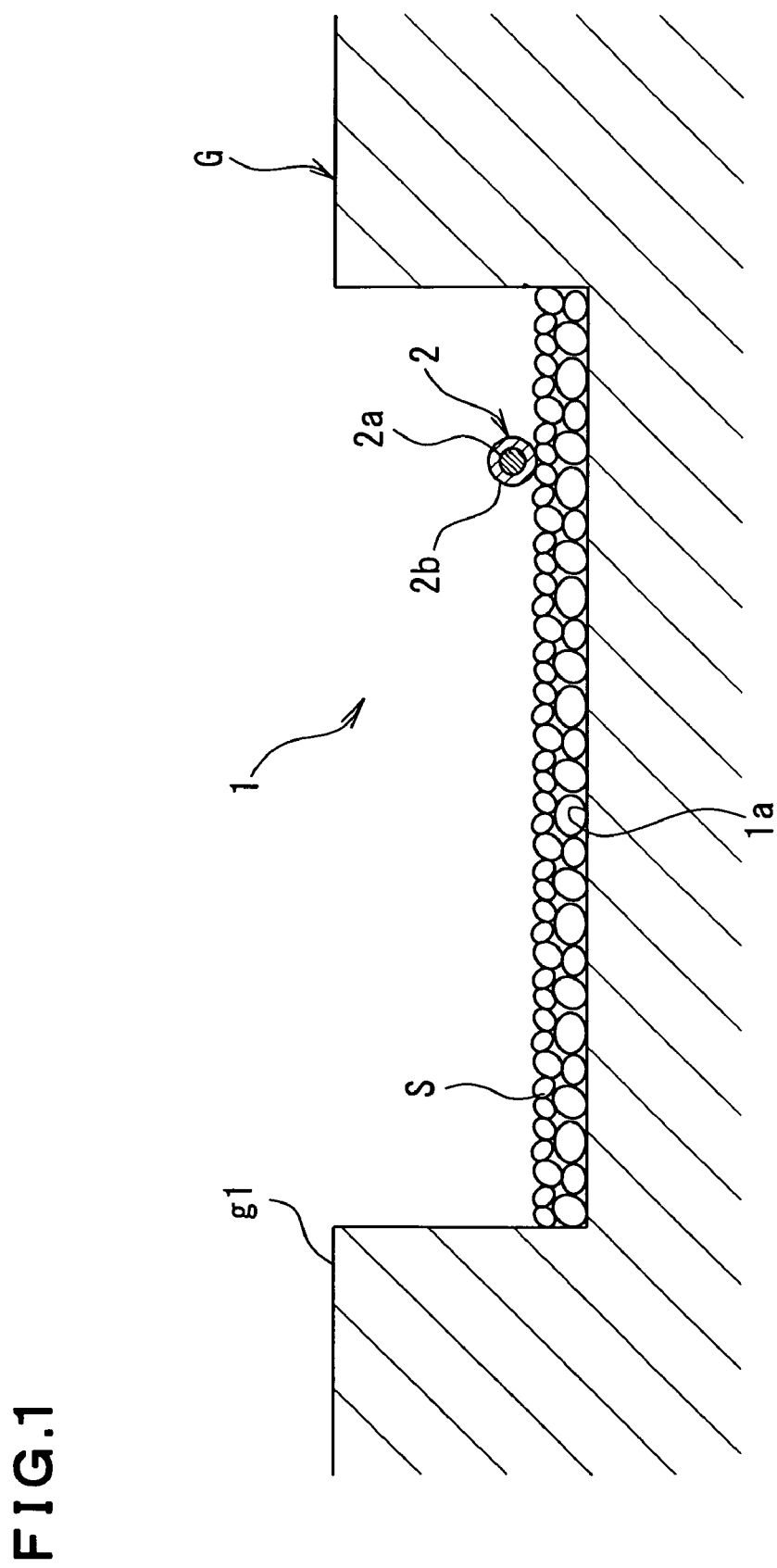
Figure 2:
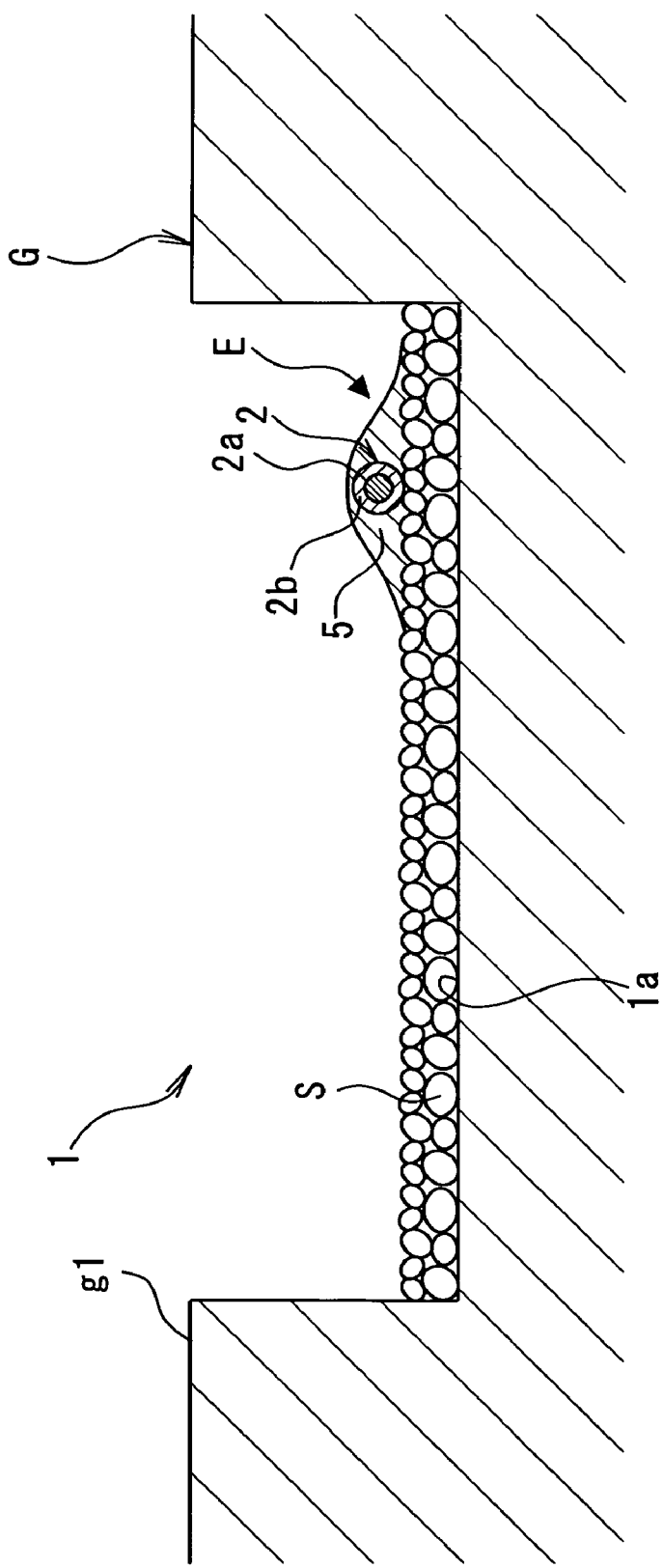
Figure 3:
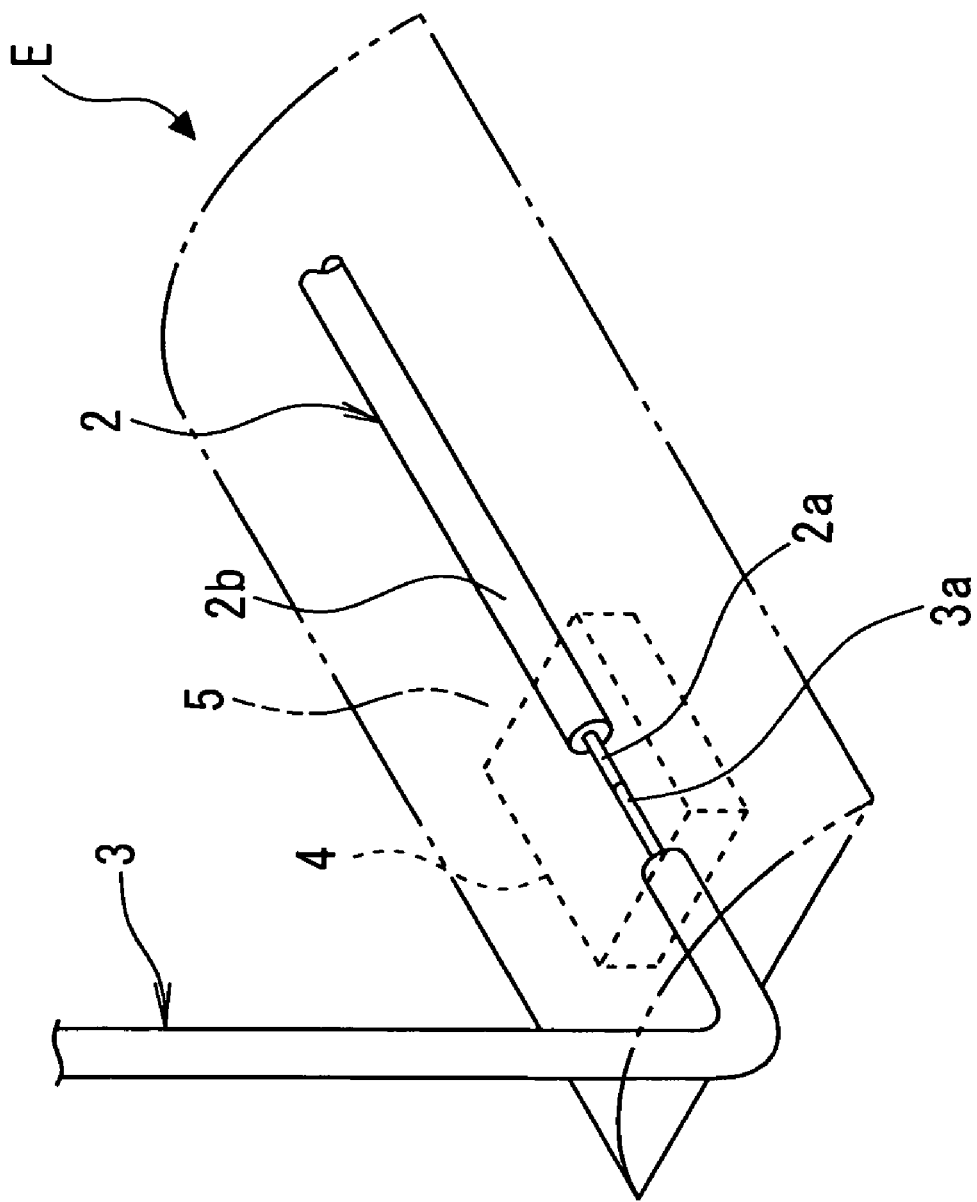
FIG. 3 is a partly enlarged perspective view of a grounding member and the like constituting a grounding device in accordance with the present invention.

The grounding conductor 2 of a predetermined length is installed directly at the bottom portion 1a of the drilled ditch 1 or via the cobble stones S. A conductive covering cap or the like is fitted around one end of the grounding conductor 2 to waterproof this end, and the conductive resin layer 2b is peeled off from the other end of the grounding conductor 2 to expose the conductive metal line 2a. The exposed conductive metal line 2a connects to a conductive metal line 3a of a grounding line 3 composed of an insulating coated line. As shown in FIG. 3, a connection box 4 or the like is used to waterproof, as required, the connection between the conductive metal line 3a of the grounding line 3 and the conductive metal line 2a exposed from the other end of the grounding conductor 2. The grounding line 3 is drawn out of the drilled ditch 1.

As described above, the grounding conductor 2 is installed at the bottom portion 1a of the drilled ditch 1, and the conductive metal line 2a of the grounding conductor 2 is connected to the conductive metal line 3a of the grounding line 3, and as described above, the one end of the grounding conductor 2 and the connection between the conductive metal line 2a of the grounding conductor 2 and the conductive metal line 3a of the grounding line 3 are waterproofed as required. Further, a conductive cement in a green concrete condition is prepared by adding water to a conductive cement composed of cement with which conductive carbon black power is blended. The grounding conductor 2 placed at the bottom portion 1a of the drilled ditch 1 is covered with the conductive cement in the green concrete condition. This results in the formation of a conductive laminated portion 5 composed of the conductive cement. A preferable procedure involves placing a conductive cement in a green concrete condition at the bottom portion 1a of the drilled ditch 1, installing the grounding conductor 2 on the conductive cement in the green concrete condition, and then covering the grounding conductor 2 with the conductive cement in the green concrete condition to bury the grounding conductor 2 in the conductive laminated portion 5.

A conductive laminated portion 5 composed of conductive cement or conductive carbon black powder can also be formed by covering the grounding conductor 2 placed at the bottom portion 1a of the drilled ditch I with a conductive cement obtained simply by blending cement with the conductive carbon black powder without adding water to the cement, or with conductive carbon black powder, instead of using the conductive cement in the green concrete condition. A preferable procedure also involves laying conductive cement or conductive carbon black power at the bottom portion 1a of the drilled ditch 1 to a predetermined thickness, installing the grounding conductor 2 on the conductive cement or conductive carbon black power laid to the predetermined thickness, and then covering the grounding conductor 2 with the conductive cement or conductive carbon black powder to bury the grounding conductor 2 in the conductive laminated portion 5.

As described above, a grounding member E is composed of the grounding conductor 2, to which the grounding line 3 is connected, the conductive laminated portion 5, which covers the grounding conductor 2, and the like.

As described above, the grounding conductor 2 installed at the bottom portion 1a of the drilled ditch 1 is covered with the conductive laminated portion 5, and then a normal nonconductive green concrete C is laid in opposite frames F installed so as to sandwich the drilled ditch 1 between them, thus forming a foundation portion B of a building. Before the normal green concrete has been poured, reinforcing bars composed of horizontal and vertical bars may be disposed in the drilled ditch 1.

When the grounding conductor 2 is covered with a conductive cement in a green concrete condition as described above, the normal green concrete C is laid after the conductive cement in the green concrete condition has been partly or completely solidified. When the normal green concrete C is laid so as to partly or entirely cover the conductive laminated portion 5, the conductive laminated portion 5 integrally overlap the foundation portion B of the building with the solidified green concrete C.

In the present embodiment, the conductive laminated portion 5 constituting the grounding member E is entirely covered with the nonconductive green concrete C. However, the conductive laminated portion 5 may be partly covered with the nonconductive green concrete C.

As described above, the grounding member E having the grounding conductor 2 and the conductive laminated portion 5 covering the grounding conductor 2 is integrated with the foundation member B of the building so that the grounding member E and the foundation member B overlap partly or entirely. This makes it possible to easily offer a small grounding resistance. Further, the foundation member B of the building contacts the earth G over a large area, and this enables a small grounding resistance to be stably offered for a long period.

As described above, the grounding conductor 2 to which the grounding line 3 is connected is placed in the drilled ditch 1 drilled when the foundation portion B of a building such as a house or a factory is formed, and the grounding conductor 2 to which the grounding line 3 is connected is then covered with the conductive laminated portion 5, and the grounding conductor 2 covered with the conductive laminated portion 5 is subsequently covered with the green concrete C. Thus, compared to the conventional method of constructing a grounding device after constructing a building, the present method can save the time and effort required to check the earth G for buried objects or the like. This makes it possible to sharply reduce the time and effort required to construct the grounding device.

Moreover, the grounding member E is integrated with the foundation portion B with the green concrete C solidified so that the grounding member E and the foundation portion B overlap partly or entirely. This makes it possible to prevent the grounding conductor 2 from corroding owing to the moisture in the earth. The grounding member and thus the grounding device can therefore last longer.

In the above embodiment, the drilled ditch 1 is formed in the earth G. However, the grounding member E may be installed on the surface g1 of the earth G without forming the drilled ditch 1.

The invention claimed is:

1. A grounding device, comprising:
    a grounding member having a grounding conductor and a conductive laminated portion covering the grounding conductor, the grounding conductor including a conductive metal line and a conductive resin layer formed in direct contact with and covering the conductive metal line, the conductive laminated portion being formed of conductive cement, and
    the grounding member being integrated with a foundation member of a building so that the grounding member and the foundation member overlap partly or entirely.

2. A method of installing a conducting device, comprising:
    forming a grounding conductor of a conductive metal line and a conductive resin layer covering the conductive metal line, the conductive resin layer being peeled off from an end of the grounding conductor to expose the conductive metal line and covering a remaining portion of the conductive metal line;
    installing the grounding conductor in an opening formed in earth;
    forming a grounding line having a conductive metal line;
    connecting the conductive metal line of the grounding conductor to the conductive metal line of the grounding line;
    covering the grounding conductor with a conductive laminated portion, the conductive laminated portion being formed of conductive cement; and
    placing green concrete in the opening formed in earth on the conductive laminated portion to form a foundation member of a building, the green concrete overlapping the conductive laminated portion partly or entirely.

3. The method of installing the conducting device as recited in claim 2, wherein the covering the grounding conductor with the conductive laminated portion comprises:

placing the conductive cement in a green concrete condition at a bottom of the opening formed in earth;

placing the grounding conductor on the conductive cement in the green concrete condition; and covering the grounding conductor with the conductive cement in the green concrete condition.

4. The method of installing the conducting device as recited in claim 2, further comprising:

connecting the conductive metal line of the grounding conductor to the grounding line that is drawn out of the opening formed in earth.

5. A grounding device, comprising:

a grounding member comprising a grounding conductor, including a conductive metal line and a conductive resin layer covering the conductive metal line, the conductive resin layer being peeled off from an end of the grounding conductor to expose the conductive metal line and covering a remaining portion of the conductive metal line, the conductive resin layer including a resin mixed with carbon black powder or conductive metal powder, and a conductive laminated portion covering at least a portion of the grounding conductor, the conductive laminated portion being formed of conductive cement or conductive carbon black powder;

a grounding line including a conductive metal line, the conductive metal line of the grounding line being connected to the exposed portion of the conductive metal line of the grounding conductor;

a connection box that covers connected portions of the conductive metal line of the grounding conductor and the conductive metal line of the grounding line to waterproof the connected portions;

a nonconductive concrete portion covering at least a portion of the conductive laminated portion, the nonconductive concrete portion forming a foundation member of a building such that the grounding member and the foundation member overlap partly or entirely.

* * * * *